March 11, 1941.    I. JEPSON    2,234,926
ELECTRIC MOTOR
Filed May 21, 1938    2 Sheets-Sheet 1
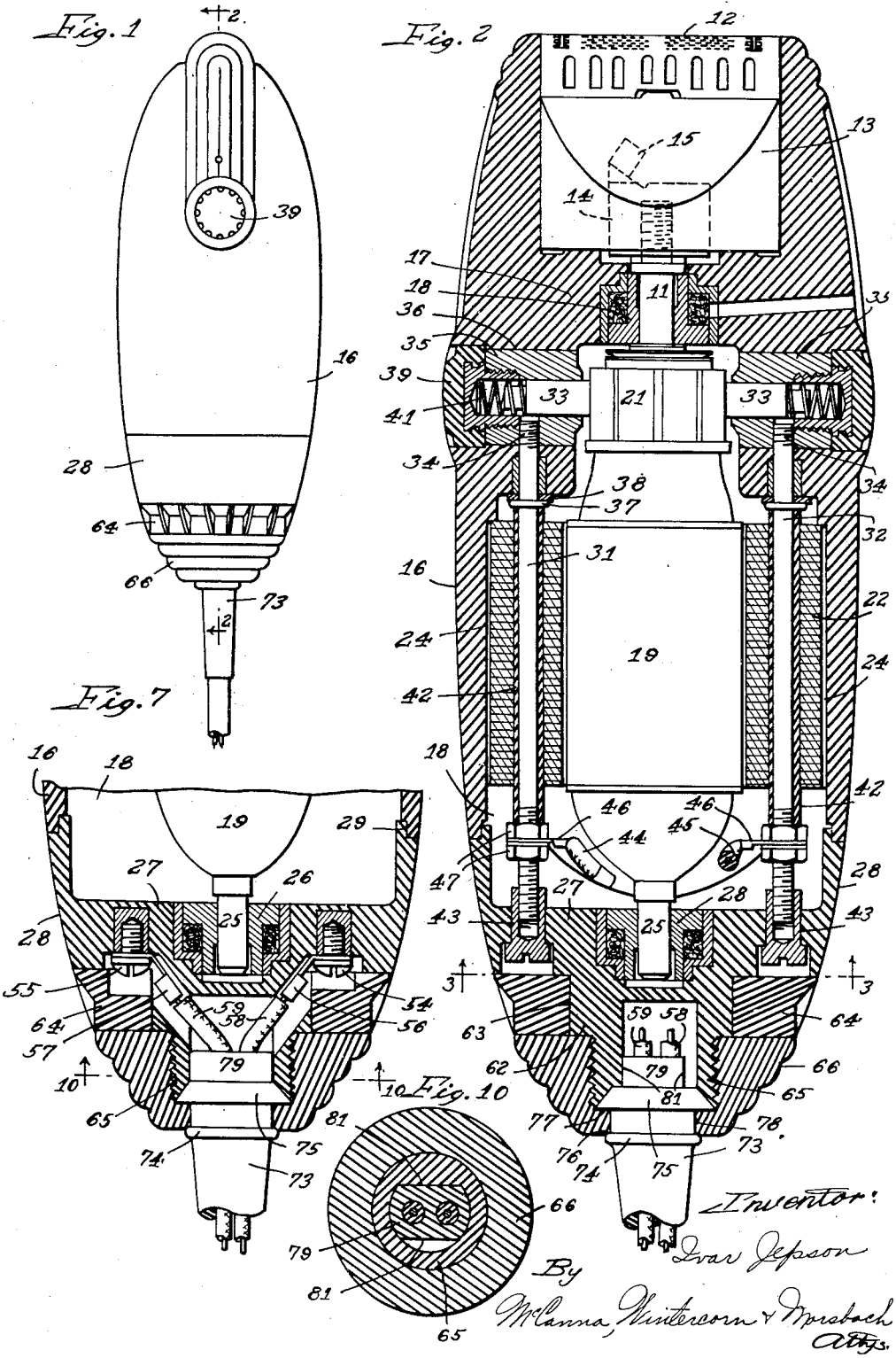

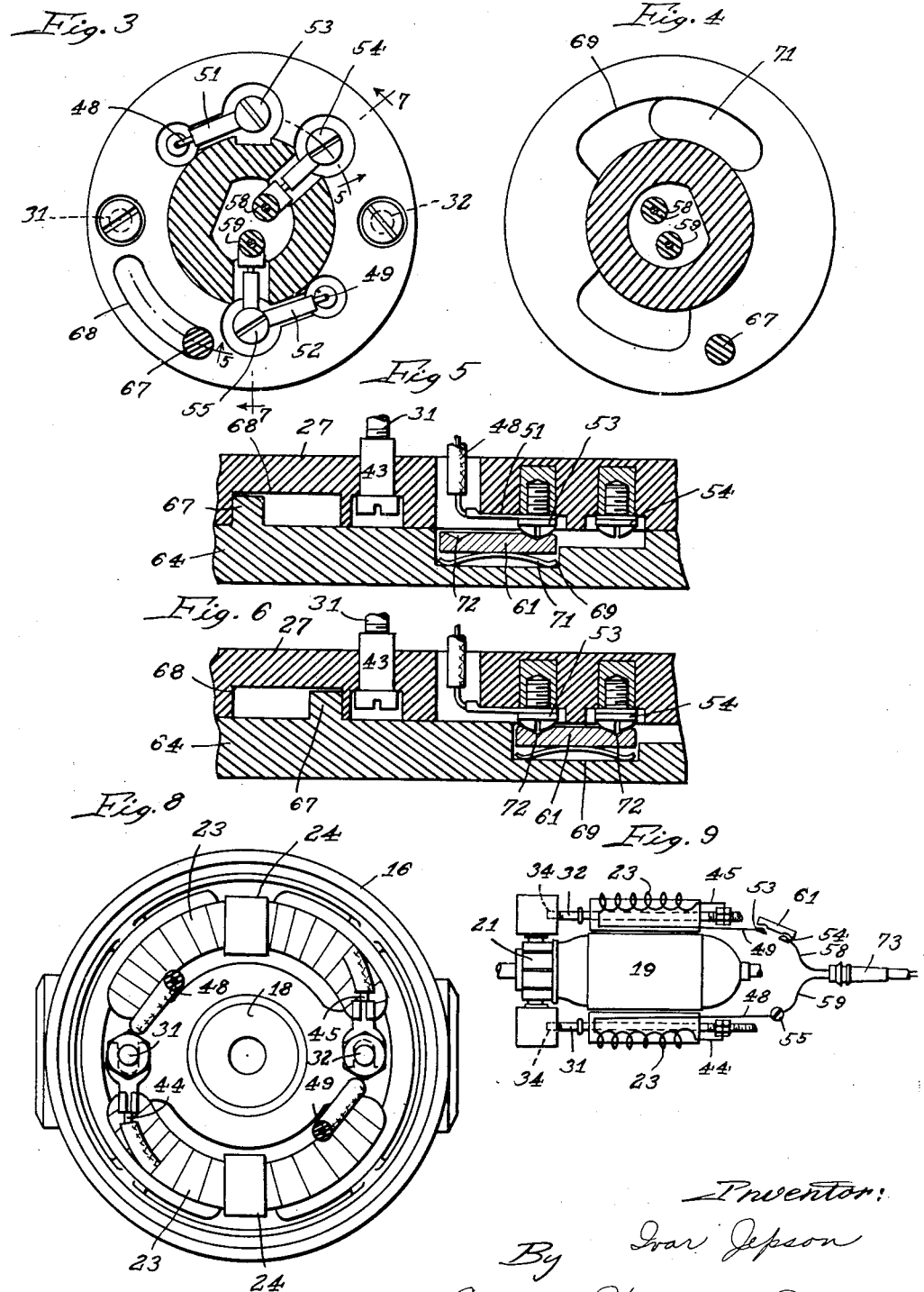

Patented Mar. 11, 1941

2,234,926

UNITED STATES PATENT OFFICE 2,234,926

ELECTRIC MOTOR

Ivar Jepson, Chicago, Ill., assignor to Chicago Flexible Shaft Company, Chicago, Ill., a corporation of Illinois Application May 21, 1938, Serial No. 209,232

19 Claims. (Cl. 172—36)

This invention relates to electric motors and has more particular reference to motors of comparatively small size such as are adapted for manually operated implements. For example, my invention is particularly useful for implements of the type in which the motor is embodied in the handle part of the implement and, in fact, the motor housing constitutes the handle proper and is preferably of such relatively small dimension as to permit of holding and operating the motor in the palm of the hand. An electric dry shaver is an implement of this type. The invention may, however, be applied to any of a large variety of implements although it is not limited to this use since manifestly the motor may be used for driving or operating any device within its intended capacity.

One of the objects of my invention is to improve the construction and assembly of motors of the small diameter type above described, with the view to obtaining a more practical and satisfactory construction.

More particularly, I have aimed to improve the construction of motors of this type to facilitate assembly of the parts, to provide a more practical and durable arrangement and cooperation of parts which will be less liable to get out of order or become defective, and to promote economies in cost of manufacture.

Another object is to provide a novel means of attaching the field leads to the brush holders. The most common way to do this is to provide the field leads with spring clips which, after the field is in place, must be snapped onto the metal brush holders which extend inside the housing. When a one-piece housing is used, that is, one of the type closed or substantially closed at the brush holder end and open at the opposite end, it is necessary to make these connections and to work through the field or the open end of the housing. The operation becomes increasingly difficult with the decrease of the field bore. There is always the danger that the lead wires and the spring clips might contact the rotating armature or might otherwise become fouled, or dislodged, or short circuited. To overcome these difficulties my invention contemplates the provision of bolts which extend through the field coil area and are connected preferably to the brush holders by threading directly into the latter and serving to retain them in position. With this construction the connections to the field can conveniently be made at the rear end of the housing after the field is put in. These leads can be very short. My invention also contemplates utilizing the bolts to hold certain parts of the housing or body structure in assembled relation such, for example, as coupling together the main housing and the rear cover. This not only makes for simple and practical construction but it promotes economies in manufacture and assembly and it also promotes durability and longer life.

Another object of my invention is to provide an improved housing construction and assembly.

Another object is to provide an improved switch construction in cooperation with other features of the invention.

Other objects and attendant advantages will be appreciated by those skilled in this art as the invention becomes better understood by reference to the following description when considered in connection with the accompanying drawings, in which—

Figure 1 is a side elevation of an electric motor embodying my invention, incorporated in an electric dry shaver;

Fig. 2 is an enlarged longitudinal section through the implement taken substantially on the section line 2—2 of Fig. 1;

Fig. 3 is a cross-section taken substantially on the section line 3—3 of Fig. 2;

Fig. 4 is a section looking opposite from Fig. 3;

Fig. 5 is a view taken substantially on the section line 5—5 of Fig. 3, with the switch open;

Fig. 6 is a similar view with the switch closed;

Fig. 7 is a sectional view through the rear end of the motor and switch similar to Fig. 2, but taken substantially on the section line 7—7 of Fig. 3;

Fig. 8 is a view looking into the open rear end of the motor with the rear cover and the armature removed;

Fig. 9 is a schematic wiring diagram showing the parts of the electric circuit; and Fig. 10 is a cross-section substantially on the line 10—10 of Fig. 7.

In illustrating my invention I have as above mentioned shown it as applied to an electric dry shaver, the present commercial form of which is shown in full size in Fig. 1. This shaving implement embodies the invention disclosed in Patent 2,081,694, granted May 25, 1937, to John Bruecker and also the invention shown in an application of said John Bruecker, Serial No. 178,221, filed December 6, 1937. Said application Serial No. 178,221 is directed to the cutting head and features of the shaver per se, as distinguished from the motor construction which is claimed in the present application. In this shaver the armature shaft 11 drives a cutter which operates in shearing coaction with a thin perforated comb 12. In the shaver invention referred to the cutter is in the form of a blade and the armature shaft serves to impart rotation to a driving mechanism contained within the drive unit 13 which transmits rapid oscillation to the blade to perform the shearing or cutting action. In the particular shaver referred to, the armature shaft is threaded into an eccentric 14, the eccentric pin 15 of which transmits motion to the oscillating blade holder, this eccentric being indicated in dotted lines in Fig. 2 merely for the purpose of showing a part of the implement operated directly by the armature shaft. It should be distinctly understood, however, that the present invention is in no way limited to operating a shaving implement but is adapted generally to motor construction regardless of what is driven by the motor.

The electric motor here shown is of a series wound, universal type, suitable for operation on alternating and direct current, and is self-starting. The motor housing designated generally by 16 is preferably of one-piece construction having a transverse wall 17 across its forward end which carries a bearing 18 for the commutator end of the armature shaft. The housing is otherwise hollow and open at its rear end 18. Certain well known parts such as the armature 19, commutator 21, field laminations 22, and field coils 23 may be of any suitable or preferred construction. The internal wall of the motor housing is grooved at opposite sides at 24 to receive the ribbed edges of the field pole laminations. The rear end 25 of the armature shaft is supported in a bearing 26 carried by the transverse wall 27 of a rear cover designated generally by 28, the cover having an overlapping rabbeted edge 29 to fit concentrically with the main housing. The rear cover and main housing are held in assembled relation by two diametrically positioned current carrying members at present in the form of bolts 31 and 32 disposed in longitudinal openings between the field poles. In addition to the function of serving as tie bolts to hold these parts of the motor housing together, the bolts serve as electrical connectors or field leads, and have electrical connection with the brushes 33. Each bolt preferably is threaded at its forward end 34 directly into a metallic brush holder 35 which is cylindrical in cross-section and is adapted to slip axially into and out of a radial bore 36 communicating with the exterior of the main housing. By turning each bolt to bind its shoulder 37 against a suitable thrust face 38 on the housing, its brush holder will be firmly and securely locked in position. An insulated brush cap screw 39 threaded into the outer end of each brush holder is removable for permitting withdrawal of its brush and it also serves as a retainer for the brush spring 41. The main housing 16 and the cover 28 are of Bakelite or some similar insulation material, and the construction as will be presently seen is such as to properly insulate all of the parts requiring insulation. The bolts 31 and 32 are separately insulated from the surrounding parts by insulation tubes 42 and the rear end of each bolt is threaded into a screw 43 which seats in the rear cover and is adapted to be tightened to clamp the cover tightly in position on the main housing. The field lead wires 44 and 45 at one end are connected by suitable terminal clips 46 to the bolts 31 and 32, respectively, between clamping nuts 47 thereon. The opposite ends 48 and 49 of the field lead wires are connected by clips 51 and 52 (Fig. 3), one to a switch terminal screw 54 and the other to a terminal screw 55. To the terminal screws 54 and 55 are connected the terminal clips 56 and 57 of current supply leads 58 and 59. The switch terminal screws 53 and 54 are adapted to be connected by means of a slidable switch connector 61, best shown in Figs. 5 and 6. This completes the electric circuit, the wiring diagram of which is shown schematically in Fig. 9. The rear cover has a rearwardly extending boss 62 the periphery 63 of which provides an annular bearing on which is supported a switch ring 64. The boss 62 is further extended to provide a threaded end 65 on which is threadedly engaged a rear cap 66 which serves to retain the switch ring in position and also to form part of a strain relief for the current supply wires. The periphery of the switch ring has a series of recesses and ribs formed therein to facilitate turning the ring by means of the fingers. Rotative movement of the ring is limited by means of a small pin or boss 67 fitting in an arcuate groove 68 in the transverse wall 27 of the rear cover. The switch ring is also recessed at 69 on its face contiguous to the wall 27 to receive a bowed spring 71 and the switch connector 61 above mentioned, the latter being retained in the switch ring against endwise movement with respect thereto so that the switch connector will move with the ring. The face of the switch ring is countersunk at points 72 to receive the heads of the switch terminal screws to improve the contact therewith. By rotative movement of the switch ring it will be manifest that the switch connector may be shifted from the open position shown in Fig. 5 to the closed position in Fig. 6, and vice versa. This switch construction and assembly is particularly desirable because the parts are entirely closed and sealed and there are no exposed metal parts, no projecting operating parts of any kind, and no openings of the kind found in ordinary switch constructions. It is also desirable because the electrical connections and switch parts are all arranged in a limited arcuate space as around the boss 62 and are insulated and housed by the rear cover and the switch ring. The strain relief feature above referred to consists in forming a molded rubber 73 about the end portion of the supply wires 58 and 59 shaped to provide opposed annular ribs 74 and 75 in cooperation with opposed shoulders 76 and 77 at opposite ends of the opening 78 in the rear cap. The shoulder 75 is of substantial radial dimension. The casing 73 is further shaped so that its end portion 79 provides one or more angular faces such, for example, as opposed parallel faces 81 one or both of which fit against a correspondingly shaped wall of a socket or opening in the boss 65. The outer end of the boss 65 is also shaped to fit against and confine the flanged part 75 of the rubber casing. As the result of this construction the casing 73 is prevented from turning axially and it is also prevented from being pulled out away from the housing proper, thus relieving the terminal wires 58 and 59 from any possible strain. When assembling these parts the strain relief casing may, however, be pushed through the opening 78 in the rear cap by displacing the shallow flange or rib 74. Also, when the rear cap is unscrewed it may be withdrawn rearwardly over the casing 73 by displacing the flange 74.

To disassemble the motor the rear cap 66 will first be unscrewed, allowing the switch ring 64 with the switch connector 61 to be withdrawn.

The three terminal screws 53, 54 and 55 will then be removed, thereby permitting the current supply leads together with the strain relief casing to be removed as a unit. The field lead clamps 51 and 52 will then be turned up to permit passage through the openings in the wall 27 of the rear cover and upon removal of the rear cover screws 43 the rear cover may be removed. The brush cap screws 39 should now be removed together with the brushes, and following this the eccentric 14 should be unscrewed from the forward end of the armature shaft, permitting the armature to be drawn endwise from the rear of the motor housing. The two field lead clips 46 and the terminal nuts 47 should then be removed. The field coil assembly may now be drawn out endwise. The insulation tubes 42 may now be slipped endwise from the bolts 31 and 32 and long-nosed pliers may be used to grip the unthreaded portions of the bolts to unscrew them from the brush holders. To assemble the parts the procedure is repeated in the reverse order.

It is believed that the foregoing conveys a clear understanding of the objects prefaced above.

The invention is not to be understood as restricted to the details set forth, since these may be modified within the scope of the appended claims, without departing from the spirit and scope of the invention.

I claim:

1. An electric motor having bolts serving as field leads connected with the commutator brushes and serving also to hold sectional portions of the motor housing in assembled relation.

2. An electric motor having bolts serving as field leads extending through the field coil area and connected to the brush holders, the bolts also serving to hold sectional portions of the motor housing in assembled relation.

3. In an electric motor, a housing open at one end, brushes for the commutator of the armature, brush holders removable radially from the housing, a cover for the open end of the housing, and bolts threading into the brush holders extending through the field coil area and serving to secure the cover in position on the housing and also serving as field leads.

4. In an electric motor, a housing having an armature bearing at one end and being opened at the opposite end for insertion of the field coils and the armature, a rear cover closing the open end of the housing and having a bearing for the rear end of the armature shaft, brush holders radially insertible in the housing, bolts extending through the field coil area and connected to the brush holders, and means connecting the opposite ends of the bolts to the rear cover to hold the cover in position on the housing.

5. A small diameter electric motor comprising a one-piece main housing adapted to be held in the palm of the hand and to serve as the main body of an implement for manual operation, the main housing having a bearing at the implement end for the commutator end of the armature shaft, brushes carried in the main housing cooperating with the commutator, the rear end of the main housing being open for reception of the field and armature parts, a rear cover closing the rear end of the main housing, removable brush holders for the brushes, and common means serving to hold the rear cover in position on the main housing and also as current conducting leads connected to the brush holders.

6. In an electric motor, a main housing having a transverse wall at one end provided with a bearing for the commutator end of the armature shaft and being open at the opposite end for reception of the field and armature parts, brushes and brush holders therefor, radially disposed openings in the motor housing for reception of the brush holders, a rear cover for the motor housing equipped with a bearing for the rear end of the armature shaft, and means extending through the field area serving to connect the rear cover to the main housing and also serving as current conducting leads connected to the brush holders.

7. An electric motor as set forth in claim 6 in which the last recited means consists of a plurality of bolts having electrical connection with the brush holders and connected to the field lead wires.

8. An electric motor as set forth in claim 6 in which the last recited means consists of a plurality of bolts having electrical connection with the brush holders and connected to the field lead wires, and threaded elements adapted to seat in recessed openings in the rear side of the rear cover and to threadedly engage the rear ends of the bolts to clamp the rear cover to the main housing.

9. An electric motor as set forth in claim 6 in which the last recited means consists of a plurality of bolts having electrical connection with the brush holders and connected to the field lead wires, and threaded elements, adapted to seat in recessed openings in the rear side of the rear cover and to threadedly engage the rear ends of the bolts to clamp the rear cover to the main housing, the rear cover having a central rearwardly extending boss, and a switch ring mounted on said boss and serving to cover and conceal said threaded elements.

10. An electric motor as set forth in claim 6 in which the last recited means consists of a plurality of bolts having electrical connection with the brush holders and connected to the field lead wires, and threaded elements adapted to seat in recessed openings in the rear side of the rear cover and to threadedly engage the rear ends of the bolts to clamp the rear cover to the main housing, the rear cover having a central rearwardly extending boss, a switch ring mounted on said boss and serving to cover and conceal said threaded elements, the rear cover boss having a further central extension, and a rear cap threaded onto said extension and serving to prevent displacement of the switch ring from its operative position.

11. A small diameter electric motor comprising a one-piece main housing adapted to be held in the palm of the hand and to serve as the main body of an implement for manual operation, the main housing having a bearing at the implement end for the commutator end of the armature shaft, brushes carried in the main housing cooperating with the commutator, the rear end of the main housing being open for reception of the field and armature parts, a rear cover closing the rear end of the main housing, a switch ring mounted on the rear cover, and switch elements in the electric circuit adapted to be closed and opened by rotative movement of the switch ring.

12. In an electric motor, a housing having an armature bearing at one end and being opened at the opposite end for insertion of the field and armature parts, a rear cover closing the open end of the housing and having a bearing for the rear end of the armature shaft, the rear cover having a reduced central boss providing an annular bearing and having a threaded portion extending beyond said bearing, a switch ring mounted on said annular bearing, and a rear cap threaded onto said threaded extension.

13. An electric motor for dry shavers and the like comprising an elongated body forming a handle for manipulating the shaver and shaped to provide an open end motor compartment at one end and a cutter driving compartment at the opposite end and carrying an armature bearing between said compartments, field and armature parts inserted into the body through the open end of the motor compartment, a rear cover closing said open end of the motor compartment and having a bearing for the opposite end of the armature shaft, said rear cover having a rearwardly extending boss providing an annular bearing and rearwardly thereof a threaded portion, a switch ring mounted on said annular bearing, a rear cap threaded onto said thread portion, and current supply wires extending through the rear cap and the threaded boss for connection with the motor fields through the intermediary of a switch having terminal elements adapted to be connected and disconnected by oscillation of the switch ring.

14. In an electric motor, a housing structure having a part carrying an armature bearing and having a projecting boss concentric with the bearing, a switch ring mounted for rotative movement on said boss, electrical connections for the motor located between said part and said switch ring and arranged in the area contiguous to the boss including switch elements one of which is movable by rotative movement of the switch ring to open and close the motor circuit, said housing part and the switch ring serving to enclose and conceal said electrical connections and switch elements.

15. An electric motor for dry shavers and the like comprising an elongated motor housing forming a handle for manipulating the shaver, the housing having a projecting boss at one end concentric with the motor axis, a switch ring mounted for rotative movement on said boss about said axis, electrical connections for the motor located between the housing and the switch ring and arranged in the area contiguous to the boss including switch elements one of which is movable by rotative movement of the switch ring to open and close the motor circuit, said housing and switch ring serving to enclose and conceal said electrical connections and said switch elements.

16. An electric motor of a type having removable commutator brush holders, a plurality of motor housing parts adapted to be disassembled, and rigid current carrying members connected to the brush holders and serving to hold said brush holders and said housing parts in assembled relation.

17. A brush-type electric motor having a housing forming a compartment open at one end for reception of the field and armature parts, brush holders for the brushes mounted at the opposite end, with capacity for free removal from their mountings, and rigid current conducting members extending through said compartment and having detachable connection at their inner end with the brush holders and detachable connection at their outer end with the field circuit, the latter connection being accessible through said open end of the housing when the field and armature parts are assembled therein, said rigid current conducting members serving through said detachable connections with the brush holders to hold them in operative position on their mountings.

18. In an electric motor of a type having commutator brush holders, a housing substantially closed at the brush holder end and open at the opposite end for reception of the field and armature parts, and current conducting members insertable through the open end of the housing and making connection at their inner end with the brush holders, at least one of said members being a field lead, the outer end of said members having detachable connection with the field circuit and being accessible through said open end of the housing for making said connection when the field and armature parts are assembled within the housing.

19. An electric motor for dry shavers and the like comprising an elongated housing forming a handle for manipulating the shaver, the housing carrying commutator brush holders adjacent to the shaving end and being substantially closed at such end, the housing being shaped to provide an open end motor compartment at the opposite end and carrying an armature bearing adjacent to its closed end, armature and field parts inserted into the housing through the open end of the motor compartment including an armature shaft journalled in said bearing and having a driving end, a rear cover closing said open end of the motor compartment and having a bearing in which the rear end of the armature shaft is journalled, and current conducting members at least one of which is a field lead insertable and removable through the open end of the housing and having quick-detachable connection at their inner end with the brush holders.

IVAR JEPSON.